Patented June 28, 1927.

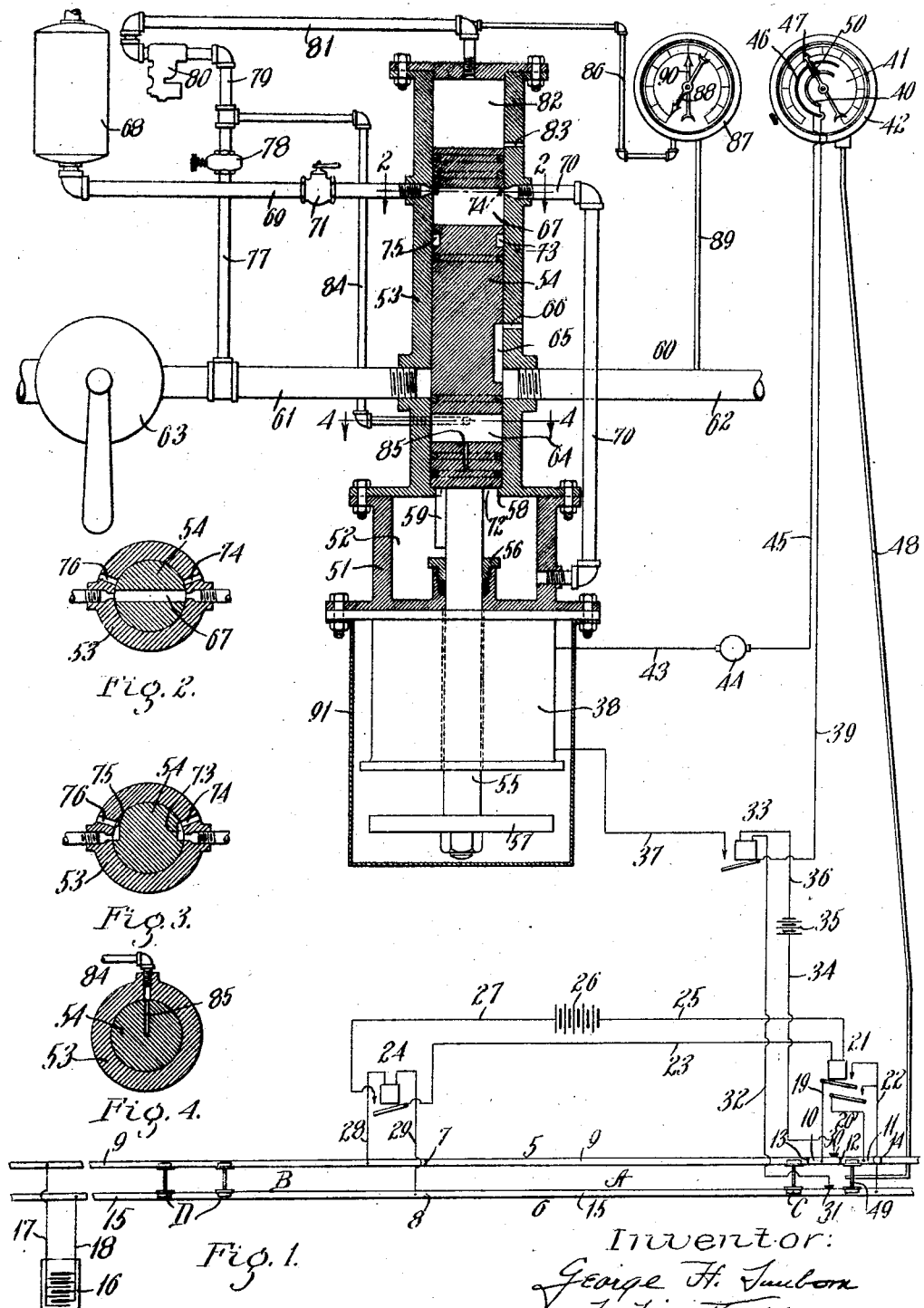

1,634,119

UNITED STATES PATENT OFFICE.

GEORGE H. SANBORN, OF MALDEN, MASSACHUSETTS.

AUTOMATIC TRAIN-CONTROL DEVICE.

Application filed April 24, 1923. Serial No. 634,355.

This invention relates to improvements in an apparatus for controlling the operation and speed of railway trains or other vehicles of a similar character.

The object of the invention is to provide an electrically operated mechanism associated with the usual fluid pressure or air brake system of a train that if said train exceeds a certain predetermined speed, or if any of the common and well known traffic conditions arise within a predetermined length of track, known as a block, which to insure safety calls for a reduction of speed or the complete stopping of the train, that the same may be accomplished by the automatic setting of the brakes provided upon said train.

The invention consists in the combination and arrangement of parts whereby the above objects and certain other objects hereinafter appearing may be attained as set forth in the following specification and particularly pointed out in the claims thereof.

Referring to the drawings:

Figure 1 is a diagrammatic representation of a device embodying the invention.

Fig. 2 is a detail transverse section through the piston valve and cylinder taken on the line 2—2 of Fig. 1.

Fig. 3 is a detail transverse section also taken on the line 2—2 of Fig. 1 but with the piston located in its raised position.

Fig. 4 is a detail transverse section taken through the cylinder on the line 4—4 of Fig. 1, but with the piston in its raised position.

Like numerals refer to like parts throughout the several views of the drawings.

In the drawings, the track equipment of the apparatus consists of rails 5 and 6 which represent a single track railway line of well known construction which is divided into sections of predetermined length known as blocks. In Fig. 1 of the drawings a portion of two adjacent blocks A and B are illustrated and the rails 5 and 6 of the block A are insulated from the corresponding rails of the block B at 7 and 8 to prevent electric communication therebetween. The rail 5 consists of live sections 9 which may be of any desired length according to the locality and conditions of traffic and two short cut-out sections 10 and 11, each preferably about six feet in length, insulated apart at 12 and from their adjacent live sections at 13 and 14 respectively. The rail 6 of each block constitutes in its entirety a live section 15. Each block is connected to a suitable main source of electric supply, preferably a storage battery 16 which is connected by wires 60 17 and 18 to the live sections 9 and 15 of the rails 5 and 6 respectively.

Wires 19 and 20 connect the cut-out sections 10 and 11 respectively of the rail 5 of the block A with a track relay 21 of well 65 known construction, while a wire 22 connects the live section 15 of the rail 6 with said track relay 21. The track relay 21 of the block B is embodied in an auxiliary track circuit and is connected by a wire 23 70 with a track relay 24 of well known construction also provided for the block B while another wire 25 connects the relay 21 with a battery 26 which latter is connected by a wire 27 to the relay 24. Wires 28 and 75 29 connect the relay 24 with the live sections 9 and 15 respectively of the block B. The relay 24 opens and closes the auxiliary track circuit to the relay 21, which, in turn, opens and closes the circuits which include 80 the cut-out sections 10 and 11.

The train equipment is preferably mounted upon the locomotive and embodies therein shoes 30 and 31 of any suitable construction which are yieldingly mounted upon said 85 locomotive in a position to engage the rails 5 and 6 respectively. The shoes 30 and 31 are insulated from each other and are positioned midway between the sets of wheels of said locomotive which the farthest 90 apart. A wire 32 connects the shoe 31 with a quick action relay 33 of well known construction and the shoe 30 is connected by a wire 34 to a battery 35 and the latter by a wire 36 to the relay 33. The relay 33 is 95 connected by a wire 37 to a solenoid 38 and by another wire 39 to a segmental-shaped contact plate 40 fastened to a dial 41 of a speed indicator 42. Another wire 43 connects the solenoid 38 with a dynamo 44 100 which forms a part of the usual equipment of the locomotive and said dynamo is connected by a wire 45 with a segmental-shaped contact plate 46 also fast to the dial 41 of the speed indicator 42, the contact plate 46 105 being parallel to the contact plate 40. The speed indicator is provided with a hand 47 which is operatively connected with a flexible shaft 48 which extends from said indicator to a point adjacent to one of the 110 wheels of the locomotive where it is operatively connected to an axle 49 and driven in the usual well known manner. A contact member 50 is fast to the hand 47, being insulated therefrom, and said contact member engages the contact plates 40 and 46 and normally completes an electric circuit therethrough, the said circuit however, being broken if the train attains a speed which rotates the hand 47 a sufficient amount to disengage the contact member 50 from the contact plates 40 and 46.

The solenoid 38 is mounted upon a cylindrical casing 51 within which a pressure chamber 52 is provided. Mounted upon the casing 51 is a cylinder 53 within which a piston 54 constituting a valve member is slidably mounted. The piston 54 is rigidly connected to an armature 55 of the solenoid 38 and said armature extends from said piston through the chamber 52 of the casing 51 through a stuffing box 56 provided in said casing and through the solenoid 38 in which it is slidably mounted and by which it is energized in the usual well known manner. The armature 55 has a bearing 57 fastened at its lower end which acts as a stop to limit the upward movement of said armature when the solenoid 38 is energized. A shoulder 58 provided at the lower extremity of the cylinder 53 limits the downward movement of the piston 54 and armature 55 when the solenoid is de-energized, while a spline 59 fast in the armature 55 engages the shoulder 58 and prevents the piston 54 from rotating in the cylinder 53.

The cylinder 53 is operatively connected to a train pipe 60 in which is a suitable pressure fluid preferably compressed air. The train pipe 60 is well known to those skilled in the art and forms a part of the usual air brake equipment of the train and the cylinder 53 is interposed between sections 61 and 62 of said train pipe, said sections being connected to the cylinder 53 upon opposite sides thereof and in longitudinal alignment with each other. The section 61 of the train pipe 60 connects with an engineer's valve 63 of the usual well known construction and also embodied in the usual air brake equipment of the train. Extending transversely through the piston 54 is a train pipe port 64 and said port aligns with the sections 61 and 62 of the train pipe 60 when said piston 54 is located in its extreme upward position and constitutes a source of communication between said pipe sections during the normal running and operation of the train. A groove 65 constituting a port is provided in the periphery of the piston 54 which constitutes an exhaust valve member and when the latter is located in its lowered position, said port provides a means of communication between the section 62 of the train pipe 60 and an exhaust port 66 provided in the cylinder 53 and the air in said train pipe is exhausted therethrough, thereby causing the air brakes of the train to be applied in a manner well known to those skilled in the art.

Another port 67 constituting an equalizing reservoir port also extends transversely through the piston 54 and when the latter is located in its lowered position as illustrated in Fig. 1 said port provides a means of communication for a suitable fluid preferably compressed air stored in an equalizing reservoir 68 to pass therefrom through a pipe 69 to the cylinder 53, and from thence through a pipe 70 to the pressure chamber 52 previously mentioned, said compressed air being controlled by a valve 71 located in the pipe 69. The compressed air admitted to the chamber 52 communicates with the interior of the cylinder 53 beneath the piston 54 through a pasasage 72 formed between the shoulder 58 and periphery of the armature 55 and acts to lift said piston from its lowered position to its raised position, at which time the supply of air to the chamber 52 is first automatically shut off by said piston and then exhausted from said chamber through the pipe 70 from which it passes through a port 73 formed in the periphery of said piston to an exhaust port 74 provided in the cylinder 53, see Fig. 3. Another port 75, similar to the port 73 is provided in the piston 54 upon the opposite side thereof from the port 73 and when said piston is located in its extreme raised position, the said port 75 communicates with an exhaust port 76 similar to the exhaust port 74 and also located in the cylinder 53. The ports 75 and 76 allow air from the equalizing reservoir 68 to exhaust therethrough until the valve 71 is closed and during the passage of said air through said ports a noise created by the air exhausting will constitute an audible signal for the engineer that the piston 54 has reached its uppermost position and that the valve 71 should be closed.

A branch pipe 77 leads from the section 61 of the train pipe 60 to a governor 78 of well known construction, and which is usually set at several pounds less than the train line pressure, and said governor is connected by a pipe 79 to a reducing valve 80 also of well known construction, and which may be regulated to supply a given amount of air pressure through a pipe 81 to a chamber 82 located within the cylinder 53 above the piston 54. An exhaust port 83 for the chamber 82 is provided in the cylinder 53 and the air within the chamber 82 is exhausted through said port 83 when the piston 54 is at its extreme lowered position. A pipe 84 connected to the pipe 79 between the governor 78 and the reducing valve 80 connects with the cylinder 53, see Fig. 4, and communicates with the train pipe port 64 when the latter is in communication with the train pipe 60 through a small passage 85 provided in the piston 54. This allows an auxiliary supply of air to be delivered from the train pipe to the reducing valve 80 when the train is running, but this supply is shut off automatically the instant the piston 54 drops. A branch pipe 86 connects the pipe 81 with a double pressure gauge 87 provided with an indicating hand 88 which indicates the pressure within the chamber 82, while a pipe 89 connects the section 62 of the train pipe 60 with the pressure gauge 87 in a manner to operate another hand 90 which indicates the pressure of the air within the train pipe 60. The solenoid 38, lower portion of the armature 55 and bar 57 are all enclosed in a casing 91 which is fastened together with said solenoid to the casing 51.

The general operation of my improved automatic train control device is as follows:—Assuming there is a train in the block A and there is no train located in the block B which said first mentioned train is approaching, or no other traffic condition exists to break the electric circuit to the relay 24 which controls the relay 21, said first mentioned train upon arriving at the short cut-out sections 10 and 11 of the block A and finding the electric circuit from said cut-out sections to the relay 21 closed, may pass on without interruption. At this time conditions upon the locomotive of the train are as follows:—The electric circuit from the battery 35 passes through the wire 34 to the contact shoe 30 and from thence through the rail 5, wheels and axles of the locomotive to the rail 6 and contact shoe 31, thence through the wire 32 to the relay 33 and wire 36 to the battery 35. This circuit being closed, and the relay 33 being energized, the electric circuit controlled by said relay to the solenoid 38 is also closed and said solenoid is energized. This last-named circuit includes the wire 37, solenoid 38, wire 43, dynamo 44, wire 45, contact plate 46, contact member 50, contact plate 40 and wire 39 to the relay 33. When the solenoid 38 is energized the piston 54 is held by said solenoid in its raised position against air pressure in the chamber 82 above said piston, and the train pipe port 64 in said piston is in communication with the sections 61 and 62 of the train pipe 60 and the air pressure in the train line is maintained. When the train line is at its required pressure, air passes through the pipe 77 to the governor 78 which is set at several pounds less than the train line pressure and said air passes from said governor through the pipe 79 to the reducing valve 80 which is regulated to supply a given amount of pressure to the chamber 82. An auxiliary source of air is obtained from the train line through the passage 85 and pipe 84 to the reducing valve 80 for the purpose of giving a continuous source of pressure to the chamber 82 through said reducing valve when for any reason the train pipe pressure is below that at which the governor 78 is set.

If, on the other hand, there is a train as represented at D in the block B, said train upon entering said block, short circuits the electric current from the main source of electric supply 16 to the relay 24, thereby opening the electric circuit to the relay 21, which, in turn, opens the electric circuit to the cut-out sections 10 and 11 of the block A. At such times the instant that the shoes 30 and 31 of the locomotive of a train, illustrated at C in the block A, reach the cut-out sections 10 and 11 of said block, said contact shoes being insulated from each other, the electric circuit to the relay 33 will be broken, thereby de-energizing said relay, with a result that the electric circuit to the solenoid 38 becomes broken, de-energizing the same and allowing the air pressure in the chamber 82 above the piston 54 to force said piston downwardly into the position illustrated in Fig. 1, thereby causing the air within the train pipe 60 to be exhausted through the ports 65 and 66, with the result that the brakes of the train will immediately be applied and the train brought to a stop.

The instant the brakes of the train are applied, the engineer if alert, is notified by the sudden slowing down of the train that there is an obstruction upon the track ahead and that caution must thereafter be employed in the operation of the train. If, upon investigation, it is found safe to proceed at a reduced speed, the engineer may do so by first moving the handle of the engineer's valve 63 to "lap position", and then operating the valve 71, thereby allowing compressed air from the equalizing reservoir 68 to pass through the pipe 69, port 67 and pipe 70 to the chamber 52 beneath the piston 54. Prior to this time the pressure of the air within the chamber 82 above the piston 54 has been reduced by exhausting through the port 83 and the air now admitted to the chamber 52 beneath said piston will force the latter upwardly until said piston has nearly reached the top of its throw, when the passage of air through the equalizing reservoir port 67 is cut-off from the pipe 70. The pressure of air within the chamber 52, however, will still continue to force the piston upwardly until the latter reaches its uppermost position where it will be held by the solenoid 38. It will be understood that under normal conditions the electric circuit which includes the battery 35 and relay 33 is always closed except when the circuit through the cut-out sections is open, and the former circuit when opened by an open cut-out section is again closed the instant the contact shoes of the locomotive pass out of the cut-out section into a live section, thereby again energizing the solenoid 38. There is not enough power, however, in the solenoid 38 even though energized to alone lift the piston 54 because of the air pressure in the chamber 82 above said piston and the latter, therefore, cannot be raised until the engineer's valve 63 is moved to "lap position" and the valve 71 operated to apply the air beneath the piston as previously described. The electric power in the track from the main source of electric supply has nothing to do with the opening and closing of the circuit to the relay 33 upon the engine except at the cut-out sections. When the piston is located in its extreme raised position, the port 73 in said piston will align with the exhaust port 74 in the cylinder allowing the air from the chamber 52 to return through the pipe 70 and be exhausted to the atmosphere. At the same time also the air from the equalizing reservoir 78 will continue to pass through the valve 71 and be discharged through the port 75 in the piston, and the exhaust port 76 in the cylinder creating a noise of rushing air which will notify the engineer that the piston has reached its normal running position and that the valve 71 should be closed.

In utilizing the speed indicator 42, the contact plates 40 and 46 are set at a certain predetermined position and as long as the train is running within the limit at which the indicator is set as determined by the position of said contact plates, the electric circuit through said contact plates will always be closed, but if the train attains such a speed that the hand 47 of said indicator moves to a position where the circuit between said plates is broken by the contact member 50 becoming disengaged therefrom, the solenoid 38 will be de-energized and the air brakes will be applied as previously described.

I claim:

1. A train control device comprising, in combination, a track, a train upon said track, a relay upon said train electrically connected to said track, a solenoid upon said train, an electric circuit upon said train opened and closed by said relay and embodying therein an auxiliary source of electric supply connected to said solenoid, a casing embodying therein a pressure chamber, a cylinder communicating with said pressure chamber, a train pipe communicating with said cylinder, a piston within said cylinder and embodying therein an exhaust valve for said train pipe, said solenoid being operatively connected to said piston and adapted to close said exhaust valve, means rendered effective by the breaking of an electric circuit to actuate said piston to open said exhaust valve, a fluid pressure reservoir and means to conduct pressure fluid from said reservoir to said pressure chamber beneath said piston to move the latter and close said exhaust valve.

2. A train control device comprising, in combination, a track, a train upon said track, a relay upon said train electrically connected to said track, a solenoid upon said train, an electric circuit upon said train opened and closed by said relay and embodying therein an auxiliary source of electric supply connected to said solenoid, a casing embodying therein a pressure chamber, a cylinder communicating with said pressure chamber, a train pipe communicating with said cylinder, a piston within said cylinder and embodying therein an exhaust valve for said train pipe, said solenoid being operatively connected to said piston and adapted to close said exhaust valve, means rendered effective by the breaking of an electric circuit to actuate said piston to open said exhaust valve, a fluid pressure reservoir and means to conduct pressure fluid from said reservoir to said pressure chamber beneath said piston to move the latter and close said exhaust valve, and also to shut off the supply of pressure fluid from said reservoir to said pressure chamber.

3. A train control device comprising, in combination, a track, a train upon said track, a relay upon said train electrically connected to said track, a solenoid upon said train, an electric circuit upon said train opened and closed by said relay and embodying therein an auxiliary source of electric supply connected to said solenoid, a casing embodying therein a pressure chamber, a cylinder communicating with said pressure chamber, a train pipe communicating with said cylinder, a piston within said cylinder and embodying therein an exhaust valve for said train pipe, said solenoid being operatively connected to said piston and adapted to close said exhaust valve, means rendered effective by the breaking of an electric circuit to actuate said piston to open said exhaust valve, a fluid pressure reservoir and means to conduct pressure fluid from said reservoir to said pressure chamber beneath said piston to move the latter and close said exhaust valve, said piston also being adapted to shut off the supply of pressure fluid from said reservoir to said pressure chamber and also embodying therein means to release the pressure in said pressure chamber during its movement to close said exhaust valve.

4. A train control device comprising, in combination, a track, a train upon said track, a relay upon said train electrically connected to said track, a solenoid upon said train, an electric circuit upon said train opened and closed by said relay and embodying therein an auxiliary source of electric supply connected to said solenoid, a casing embodying therein a pressure chamber, a cylinder communicating with said pressure chamber, a train pipe communicating with said cylinder, a piston within said cylinder and embodying therein an exhaust valve for said train pipe, said solenoid being operatively connected to said piston and adapted to close said exhaust valve, means to conduct a pressure fluid from said train pipe to said cylinder above said piston to actuate the latter to open said exhaust valve, a fluid pressure reservoir and means to conduct pressure fluid from said reservoir to said pressure chamber beneath said piston to move the latter and close said exhaust valve.

5. A train control device comprising, in combination, a track, a train upon said track, a relay upon said train electrically connected to said track, a solenoid upon said train, an electric circuit upon said train opened and closed by said relay and embodying therein an auxiliary source of electric supply connected to said solenoid, a casing embodying therein a pressure chamber, a cylinder communicating with said pressure chamber, a train pipe communicating with said cylinder, a piston within said cylinder and embodying therein an exhaust valve for said train pipe, said solenoid being operatively connected to said piston and adapted to close said exhaust valve, means to conduct a pressure fluid from said train pipe to said cylinder above said piston to actuate the latter to open said exhaust valve, means to reduce the pressure of said fluid between said train pipe and said cylinder, a fluid pressure reservoir and means to conduct pressure fluid from said reservoir to said pressure chamber beneath said piston to move the latter and close said exhaust valve.

6. A train control device comprising, in combination, a track, a train upon said track, a relay upon said train electrically connected to said track, a solenoid upon said train, an electric circuit upon said train opened and closed by said relay and embodying therein an auxiliary source of electric supply connected to said solenoid, a cylinder, a train pipe embodying therein sections communicating with said cylinder, a piston within said cylinder and embodying therein an exhaust valve for said train pipe, said piston also embodying therein a train pipe port, said solenoid being connected to said piston and adapted to operate the latter to close said exhaust valve and establish communication between the sections of said train pipe through said train pipe port and means rendered effective by the breaking of an electric circuit to actuate said piston to break communication between said train pipe sections through said train pipe port and also open said exhaust valve.

7. A train control device comprising, in combination, a track, a train upon said track, a relay upon said train electrically connected to said track, a solenoid upon said train, an electric circuit upon said train opened and closed by said relay and embodying therein an auxiliary source of electric supply connected to said solenoid, a casing embodying therein a pressure chamber, a cylinder communicating with said pressure chamber, a train pipe embodying therein sections communicating with said cylinder, a piston within said cylinder and embodying therein an exhaust valve for said train pipe, a train pipe port and a pressure reservoir port; a fluid pressure reservoir, means communicating with said cylinder and pressure reservoir port of said piston to conduct pressure fluid from said reservoir to said pressure chamber beneath said piston, said pressure fluid being adapted to move said piston to close said exhaust valve and establish communication between the sections of said train pipe through said train pipe port and to break communication from said pressure reservoir to said pressure chamber through said pressure reservoir port and means rendered effective by the breaking of an electric circuit to actuate said piston to break communication between said train pipe sections through said train pipe port, to open said exhaust valve and to establish communication between said pressure reservoir and said pressure chamber through said pressure reservoir port.

In testimony whereof I have hereunto set my hand.

GEORGE H. SANBORN.